United States Patent [19]
Michner

[11] 4,092,576
[45] May 30, 1978

[54] METHOD AND APPARATUS FOR FACSIMILE SCANNING
[75] Inventor: James G. Michner, Casselberry, Fla.
[73] Assignee: Exxon Research & Engineering Co., Linden, N.J.
[21] Appl. No.: 622,215
[22] Filed: Oct. 14, 1975
[51] Int. Cl.² .............................................. G05B 1/06
[52] U.S. Cl. ................................... 318/314; 318/318; 318/72; 358/275
[58] Field of Search ................. 318/318, 314, 313, 72; 358/274, 275, 269–273

[56] References Cited
U.S. PATENT DOCUMENTS

| 2,230,821 | 2/1941 | Artzt | 358/278 |
|---|---|---|---|
| 3,231,807 | 1/1966 | Willis | 318/314 X |
| 3,622,703 | 11/1971 | Ricketts et al. | 318/318 X |
| 3,885,206 | 5/1975 | Hort | 318/318 X |
| 3,906,319 | 9/1975 | Milligan | 318/318 |
| 3,952,237 | 4/1976 | Kimizuka | 318/314 X |

Primary Examiner—B. Dobeck
Attorney, Agent, or Firm—Norman L. Norris

[57] ABSTRACT

A facsimile transceiver comprises a rotatably mounted drum and an information transducer juxtaposed to the drum for marking on a copy medium carried by the drum or detecting dark-light variations in a document carried by the drum. The drum is driven by a DC motor with the speed of the motor controlled by a phase locked loop in which the phase and frequency of reference pulses are compared with the phase and frequency of pulses having a frequency proportional to the speed of rotation of the drum.

15 Claims, 3 Drawing Figures

METHOD AND APPARATUS FOR FACSIMILE SCANNING

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing dark-light variations in the document being scannd. These information-bearing signals are transmitted over the communications network to a facsimile receiver where the information-bearing signals are converted to marks or images on a copy medium so as to form a copy which is a facsimile of the original document.

Typically the document at the transmitter circumscribes a rotatably mounted transmitter drum and the copy medium at the receiver similarly circumscribes a rotatably mounted receiver drum. The transmitter drum and the receiver drum are then rotated or revolved at substantially the same angular frequency so that the area of the document scanned by optical pickup means in a given period of time equals the area of the copy medium traversed by a writing mechanism such as a stylus in the receiver for the same period of time. In other words, the scanning rate of the transmitter as determined by the speed of rotation of the transmitter drum must be equal to, within very close tolerances, of the scanning rate at the receiver as determined by rotation of the receiver drum. In general, reliable facsimile transmission requires that the scanning rate of the transmitter and receiver be synchronized on a short term basis to an accuracy of one part in 1,000 during each revolution of the drum. On a long term basis (i.e., over the duration of the facsimile transmission), the scanning rates should be synchronized to one part in 20,000 and preferably to one part in 50,000 so as to avoid skew.

In order to achieve the necessary facsimile scanning rate control, facsimile transmitters, receivers or transceivers typically utilize synchronous motors which are driven by an AC source of known frequency. The AC source may comprise a power line where the equality of frequency at the transmitter and receiver is assured when the transmitter and receiver are operating on the same power grid. In the alternative, the reference frequency may be provided by a crystal oscillator as disclosed in copending application Ser. No. 493,119 filed July 30, 1974.

Although the use of synchronous motors with appropriate AC drives can achieve the necessary accuracy in scanning rates for facsimile operation, the synchronous motors do have certain drawbacks. First, an AC synchronous motor and associated drive mechanism is typically larger than a DC motor capable of driving the same load, and the size of the AC synchronous motor may, at times, present a packaging problem in a facsimile unit which should be relatively compact.

In addition, an AC synchronous motor typically utilizes more power than a DC motor and operates at higher voltages. Also, a DC is capable of operating over a wide range of scanning speeds so as to permit the operation of a facsimile unit in different scanning modes while an AC synchronous motor is limited to a relatively small range of speed near its designed synchronous speed. Finally, the less expensive AC motor may be acoustically more noisy than a DC motor and this can be a very important factor in an acoustically coupled facsimile transmission.

As set forth in the foregoing, the use of a DC motor in a facsimile unit is advantageous as compared with an AC synchronous motor in many respects. However, DC motors have not been utilized in facsimile units because of the difficulty in maintaining the necessary accuracy in scanning rates.

SUMMARY OF THE INVENTION

It is an object of this invention to provide a facsimile unit which enjoys the advantages afforded by a DC scanning motor while at the same time achieving the accuracy in scanning rates necessary for facsimile transmission and reception.

In accordance with this and other objects of this invention, a preferred embodiment of the invention comprises a rotatably mounted drum and information transducer means juxtaposed to the drum during rotation through various angular positions. A DC motor is coupled to the rotatably mounted drum so as to drive the drum through the various angular positions. The speed of the DC motor is controlled by a phase locked loop comprising signal generating means responsive to rotation of the drum for generating a speed indicative signal substantially proportional to the rotation of the drum. The speed indicative signal is applied to a phase comparator which compares the frequency and phase of the speed indicative signal with a reference signal. The output of the phase comparator which represents the deviation of the frequency and phase of the speed indicative signal from the reference signal is applied to motor drive means for driving the DC motor at a speed such that the speed indicative signal is locked in phase and frequency to the reference signal.

In accordance with one important aspect of the invention, the frequency of the reference signal substantially exceeds the frequency of rotation of the drum. In other words, where the signal comprises a series of speed indicative pulses, a substantial number of pulses are generated from each rotation of the drum. To assure synchronization on a short term basis, the frequency of the reference pulses exceeds the frequency of drum rotation by at least 400%, i.e. there are at least five reference pulses generated for each revolution of the drum. On the other hand, to assure synchronization on a long term basis, the frequency of the reference pulses need not exceed the frequency of drum rotation. In a particularly preferred embodiment where short term synchronization is achieved, there are 160 reference pulses generated for each revolution of the drum where the drum is driven by a motor through a gear train such that there are 8 reference pulses per revolution of the motor.

In the preferred embodiment of the invention, the speed pulse generating means comprises a tachometer coupled to a DC motor. The tachometer may include rotatable means associated with a motor and photodetector means in optical communication with the rotatable means for generating the speed indicative pulses. The optical communication may be achieved by fiber optics coupled between the photodetector means and the rotatable means.

DETAILED DESCRIPTION OF A PREFERRED EMBODIMENT

Figure 1:
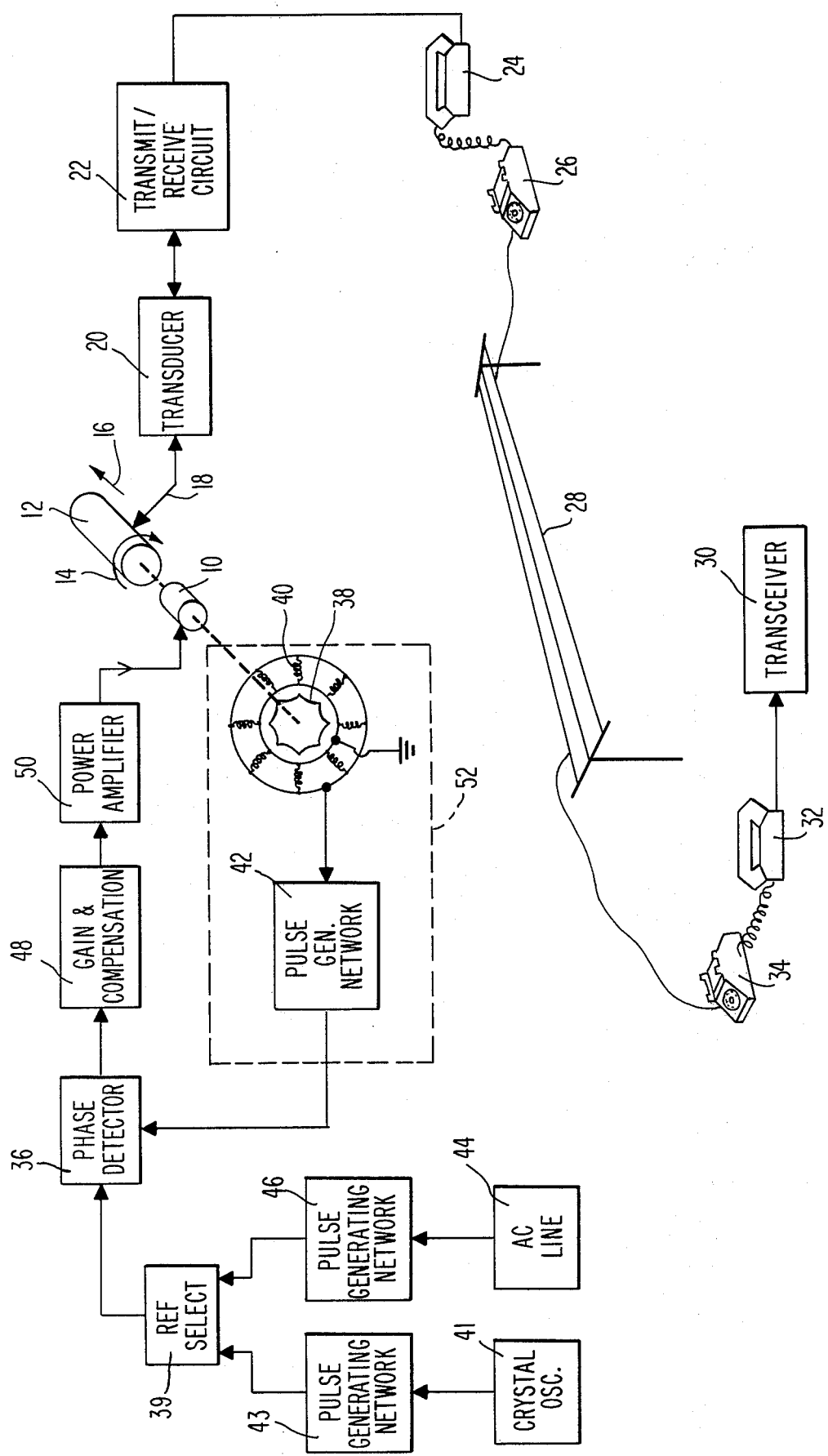
FIG. 1 is a block diagram of a facsimile system including a facsimile transceiver embodying the invention.

Referring now to the facsimile system shown in FIG. 1, a facsimile transceiver comprises a drum 12 rotated by a motor 10 in a direction depicted by an arrow 14 so as to create a relative scanning movement between a document or copy medium carried by the drum 12 and a scanning head not shown. As the scanning head is advanced axially along the drum 12 as indicated by an arrow 16 and the drum rotates about its axis as indicated by the arrow 14, successive paths on the document or copy medium are placed in communication as depicted by line 18 with suitable transducer means 20 including a photodetector and stylus.

When the transceiver is operating in a transmit mode, the photodetector of the transducer means 20 detects variations in light intensity due to the reflectivity of the document as the document is being scanned by the photodetector via a path of optical communication as depicted by the line 18. The output from the photodetector of the transducer means 20 is then applied to the transmission circuit of a transmit/receive circuit 22. When the transceiver is operating in a receiving mode, the transmit/receive circuit demodulates signals representing dark-light variations in a remotely located document and the output of the receive circuitry is applied to the transducer means 20 for energizing the stylus thereof so as to mark on the copy medium carried by the drum 12 in the area of communication as depicted by the line 18.

The transmit/receive circuit is connected to an acoustical coupler 24 which is associated with a conventional telephone handset 26. The handset 26 is then connected to a suitable communications link such as conventional telephone lines 28 which permit the transceiver to transmit to or receive from another transceiver 30 which is associated with another acoustical coupler 32 and a telephone handset 34.

In accordance with this invention, the motor 10 of the transceiver is of the DC type. In further accordance with this invention, the speed or velocity of the motor 10 and hence the rotational speed or velocity of the drum 12 is controlled by a phase locked loop and a source of a reference signal in the form of pulses which will now be described in detail.

As shown in FIG. 1, the phase locked loop includes a phase detector 36 which compares the phase and frequency of pulses generated by a tachometer coupled to the DC motor 10 with the phase and frequency of reference pulses. As shown in FIG. 1, the tachometer comprises an AC tachometer winding 40 magnetically coupled to the permanent magnet rotating armature 38 of the motor 10. As shown, the AC tachometer winding 40 and the permanent magnet 38 will generate a sinusoidal signal having a frequency eight times the frequency of revolution for the motor 10 and a frequency 60 times the frequency of revolution of the drum as driven by a motor through a gear train having a 20:1 ratio. The sinusoidal signal from the tachometer winding 40 is then applied to a pulse generating network 42 so as to generate a series of pulses having a frequency eight times the frequency of revolution of the motor 10. It will therefore be understood that the frequency of the speed indicative pulses from the network 42 substantially exceeds the frequency of revolution of the drum 12 so as to achieve the desired short term as well as long term synchronization. The output from the network 42 is then applied to the phase detector 36 for comparison in phase and frequency with reference pulses.

The reference pulses as shown in FIG. 1 may be generated by one of two sources and selected by reference select circuitry 39. On the one hand, the reference pulses may be generated by a crystal oscillator 41 which is coupled to a pulse generating network 43 and applied to the phase detector 36 if the reference select circuitry 38 is in the crystal reference mode. On the other hand, the reference pulses may be generated from an AC power line 44 which is coupled to a pulse generating network 46 when the reference select circuitry 38 is in the AC line mode.

The phase detector 36 generates an output signal which varies in response to the phase and frequency of the speed indicative pulses from the pulse generating network 42 as compared with the phase and frequency of the reference pulses applied through the reference select circuit 38. The output from the phase detector 36 is then applied to gain and compensation circuitry 48 for application to a power amplifier 50 which is coupled to the motor 10.

Figure 3:
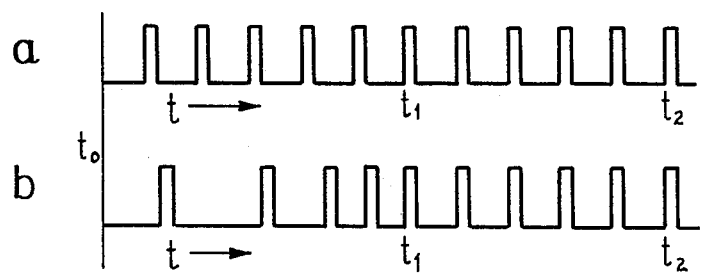
FIG. 3 is a waveform diagram depicting the frequency and phase locking of speed indicative pulses and reference pulses generated by the facsimile transceiver shown in FIG. 1.

The function and importance of the phase locked loop including the phase detector 36 may be more fully understood with reference to FIG. 3. As shown therein, waveform "a" depicts a series of reference pulses which are generated from time $t_0$ to $t_2$. Waveform "b" depicts a series of speed indicative pulses which are generated in the same time frame. At time $t_0$, the pulses in waveform "a" and the pulses in waveform "b" are out of phase and the frequency of pulses in waveform "b" is substantially greater than the frequency of pulses in waveform "a." In other words, the tachometer coupled to the motor 10 depicts a motor speed which is insufficient to generate speed indicative pulses of the same frequency as the reference pulses applied to the phase detector 36. By time $t_1$, the speed of the motor 10 has reached the point that the speed indicative pulses are equal in frequency to the reference pulses. Moreover, the speed indicative pulses of waveform "b" and the reference pulses in waveform "a" are of the same phase. Once this phase relationship is achieved, the phase detector 36 assures a phase locked condition which is maintained from time $t_1$ through time $t_2$.

It is this phase locked condition that permits the speed of the drum 12 to be closely regulated so as to assure that the scanning rate at one transceiver is the same within an accuracy of one part in 20,000 as the scanning rate of another transceiver to which it is transmitting or from which it is receiving. As stated earlier, it is preferable to achieve a scanning regulation which is accurate to within one part in 50,000 and the system as described in the foregoing is capable of achieving such accuracy.

As shown in FIG. 1, a block 52 designates the means by which the speed indicative pulses are generated as part of the phase locked loop. The circuitry within the block 52 may be substituted for the circuitry shown in FIG. 2 to achieve the same accuracy.

Figure 2:
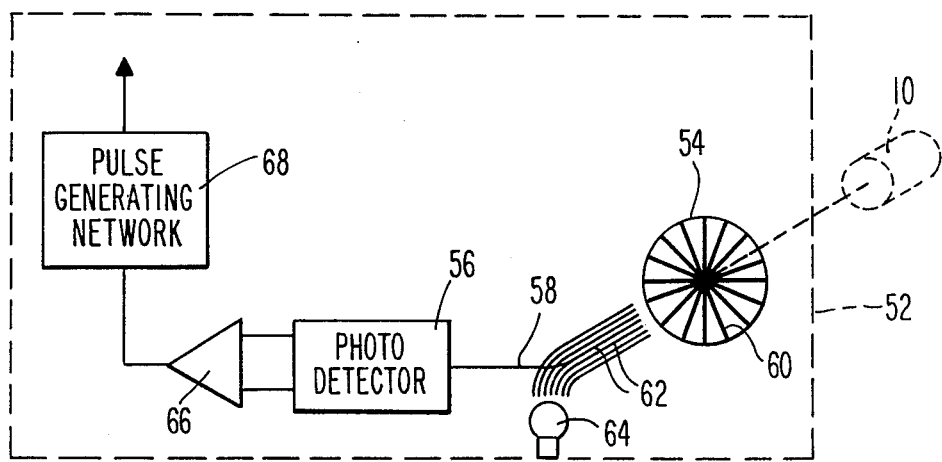
FIG. 2 is a block diagram of a modification in the phase locked loop of the transceiver shown in FIG. 1.

More particularly, and as shown in FIG. 2, the speed indicative pulse generating means may comprise a rotatable disc 54 which is coupled to the motor 10 so as to rotate at the same speed or a speed directly proportional to the speed of the drum 12. The disc 54 is in optical communication with a photodetector 56 by means of a fiber optic 58 which senses the dark-light variations created by markings 60 on the disc 54. In order to assist in the detection of these dark-light variations, a plurality of fiber optics 62 substantially surrounding the fiber optic 58 are coupled to a light source 64 so as to illuminate the disc 54 and the markings 60 thereon. The output from the photodetector 56 is then applied to an operational amplifier 66 which is connected to a pulse generating network 68 similar to the pulse generating network 42 shown in FIG. 1.

The particular DC motor 10 which is utilized may vary. For example, a pancake motor design having a rotating disc armature characterized by a high starting torque may be utilized which eliminates the necessity for an intermediate gear train between the motor 10 and the drum 12. Furthermore, a pancake motor comprises markings on the disc armature which may themselves be optically detected to generate the speed indicative pulses. A suitable motor is manufactured by the PMI Division of the Kollmorgen Corporation. Such a motor is disclosed in U.S. Pat. Nos. 3,144,574 — Henry-Baudot and 2,970,238 — Swiggett which are incorporated herein by reference.

When the motor 10 is of a pancake design, the output stage of the power amplifier 50 may be compared to a high current linear operational amplifier. In the alternative, a power amplifier 50 may comprise a direct current switching amplifier so as to avoid the large average currents and eliminate the neccessity for large heat sinks. A suitable direct current switching amplifier for use in a facsimile transceiver is disclosed in co-pending application Ser. No. 622,214 filed Oct. 14, 1975 which is assigned to assignee of this invention and incorporated herein by reference. The aforesaid application also discloses suitable pulse generating networks 42, 43 and 46 which are also incorporated herein by reference along with a suitable phase detector 36 also disclosed therein.

Although the transducer circuitry 20 and the transmit/receive circuitry 22 have not been shown in detail, suitable circuitry is disclosed in copending application Ser. No. 606,507 filed Aug. 21, 1975 and Ser. No. 606,506 filed Aug. 21, 1975, both of which are assigned to the assignee of this invention and incorporated herein by reference.

It will be understood that the use of a DC motor allows the speed of the motor to be varied by varying the frequency of the reference pulses. Accordingly, it is possible to greatly increase the scanning rate and thereby reduce the transmission time. On the other hand, it is possible to reduce the scanning rate and the speed of the motor 10 by decreasing the frequency of the reference pulses thereby increasing the resolution of facsimile reproduction transmitted by way of ordinary telephone lines. Thus, it will be seen that the use of a DC motor speed control in accordance with this invention permits great flexibility in the use of the same facsimile transceiver.

Further details concerning the fiber optics 58 and 62 and the appropriate spacing relative to the disc 54 may be found in copending application Ser. No. 412,989 filed Nov. 5, 1973 which is incorporated herein by reference. Other details concerning the use of fiber optics and the configuration of the optics 58 relative to the optics 62 are disclosed therein and incorporated herein by reference.

Although signals utilized in the phase locked loop have been described as pulses, it will be understood that other wave shapes may be utilized including sinusoidal wave shapes. It should therefore be understood that only a preferred embodiment of the invention has been shown and described and other embodiments and modifications would fall within the true spirit and scope of the invention as set forth in the appended claims.

What is claimed is:

1. A facsimile unit comprising:
 a scanning means;
 information transducer means associated with said scanning means;
 DC motor means;
 means for coupling said DC motor means to said scanning means such that the scanning frequency of said scanning means is substantially less than the frequency of said DC motor means;
 a source for generating a reference frequency signal; and
 a phase locked loop comprising
  scanning rate signal generating means more closely coupled and responsive to said DC motor means than said scanning means for generating a scanning rate indicative signal having a frequency substantially proportional to the frequency of said DC motor means and substantially larger than the scanning frequency of said scanning means;
  phase comparator means coupled to said scanning rate signal generating means and said source for generating a reference frequency signal for comparing the frequency and phase of said scanning rate indicative signal with said reference frequency signal; and
  motor drive means coupled to said phase comparator for dring said DC motor at a speed such that said scanning rate indicative signal is locked in phase to said reference frequency signal.

2. The facsimile unit of claim 1 wherein said source of said reference frequency signal comprises a crystal oscillator.

3. The facsimile unit of claim 1 wherein said source of said reference signal frequency comprises a power line.

4. The facsimile unit of claim 1 wherein said scanning rate signal generating means comprises a tachometer associated with said DC motor means.

5. The facsimile unit of claim 4 wherein said tachometer comprises rotatable means associated with said motor and photodetector means in optical communication with said rotatable means for generating said speed indicative signal.

6. The facsimile unit of claim 5 including fiber optics means coupled between said photodetector means and said rotatable means.

7. The facsimile unit of claim 1 wherein said scanning means comprises a rotatably mounted drum and said DC motor means is coupled thereto.

8. A method of operating a facsimile unit comprising a rotatably mounted drum, information transducer means juxtaposed to said drum during rotation through various angular positions, DC motor means, gear train means coupling said motor to said rotatably mounted drum, and motor drive means coupled to said DC motor means, the method comprising the following steps:

generating a reference signal having a reference frequency;

generating a speed indicative signal from said motor rather than said drum so that said drum rotates at a substantially lower angular frequency than said motor, said signal having a frequency substantially corresponding to the speed of said drum;

comparing the phase and frequency of said reference signal and said speed indicative signal; and driving said DC motor means at a frequency in response to the comparison so as to phase lock said speed indicative signal to said reference signal.

9. The method of claim 8 wherein the frequency of said reference signal substantially exceeds the frequency of revolution of said drum.

10. The facsimile unit of claim 8 wherein said information transducer means is juxtaposed to said drum during rotation during rotation through various angular positions.

11. A method of operating a facsimile unit comprising scanning means, information transducer means associated with said scanning means, and DC motor means coupled to said scanning means, said method comprising the following steps:

creating a scanning motion by said DC motor means;

driving said DC motor means at a motor frequency substantially greater than the scanning frequency of said scanning means coupled thereto;

generating a reference signal characterized by a reference frequency;

detecting the frequency of the DC motor means rather than the scanning frequency;

generating the scanning rate indicative signal from the detected frequency of the DC motor means which is characterized by a frequency substantially greater than the frequency of said DC motor means; p1 comparing the phase of said reference frequency with the phase of said scanning rate indicative signal; and adjusting the drive of said motor to achieve substantial phase lock between said reference frequency and said scanning rate indicative signal.

12. A facsimile unit comprising:

a scanning means;

information transducer means associated with said scanning means;

DC motor means;

means for coupling said DC motor means to said scanning means;

a source for generating a reference frequency signal; and a phase locked loop comprising scanning rate signal generating means more closely coupled to said DC motor means than said scanning means for generating a scanning rate indicative signal having a frequency substantially proportional to the frequency of said DC motor means and substantially larger than the scanning frequency of said scanning means;

phase comparator means coupled to said scanning rate signal generating means and said source for generating a reference frequency signal for comparing the frequency and phase of said scanning rate indicative signal with said reference frequency signal; and motor drive means coupled to said phase comparator for driving said DC motor at a speed such that said scanning rate indicative signal is locked in phase to said reference frequency signal.

13. The facsimile unit of claim 12 wherein said scanning rate signal generating means comprises a tachometer associated with said DC motor means.

14. The facsimile unit of claim 12 wherein said tachometer comprises rotatable means associated with said motor and photodetector means in optical communication with said rotatable means for generating said speed indicative signal.

15. A method of operating a facsimile unit comprising scanning means, information transducer means associated with said scanning means, and DC motor means coupled to said scanning means, said method comprising the following steps:

creating a scanning motion by said DC motor means;

driving said DC motor means at a motor frequency substantially greater than the scanning frequency of said scanning means coupled thereto;

generating a reference signal characterized by a reference frequency;

directly detecting the frequency of the DC motor means;

generating the scanning rate indicative signal from the detected frequency of the DC motor means which is characterized by a frequency substantially greater than the frequency of said DC motor means;

comparing the phase of said reference frequency with the phase of said scanning rate indicative signal; and adjusting the drive of said motor to achieve substantial phase lock between said reference frequency and said scanning rate indicative signal.

* * * * *